Jan. 7, 1969  J. R. CRABB  3,420,038
FRUIT BOX FILLER
Filed Sept. 7, 1965 Sheet 1 of 3
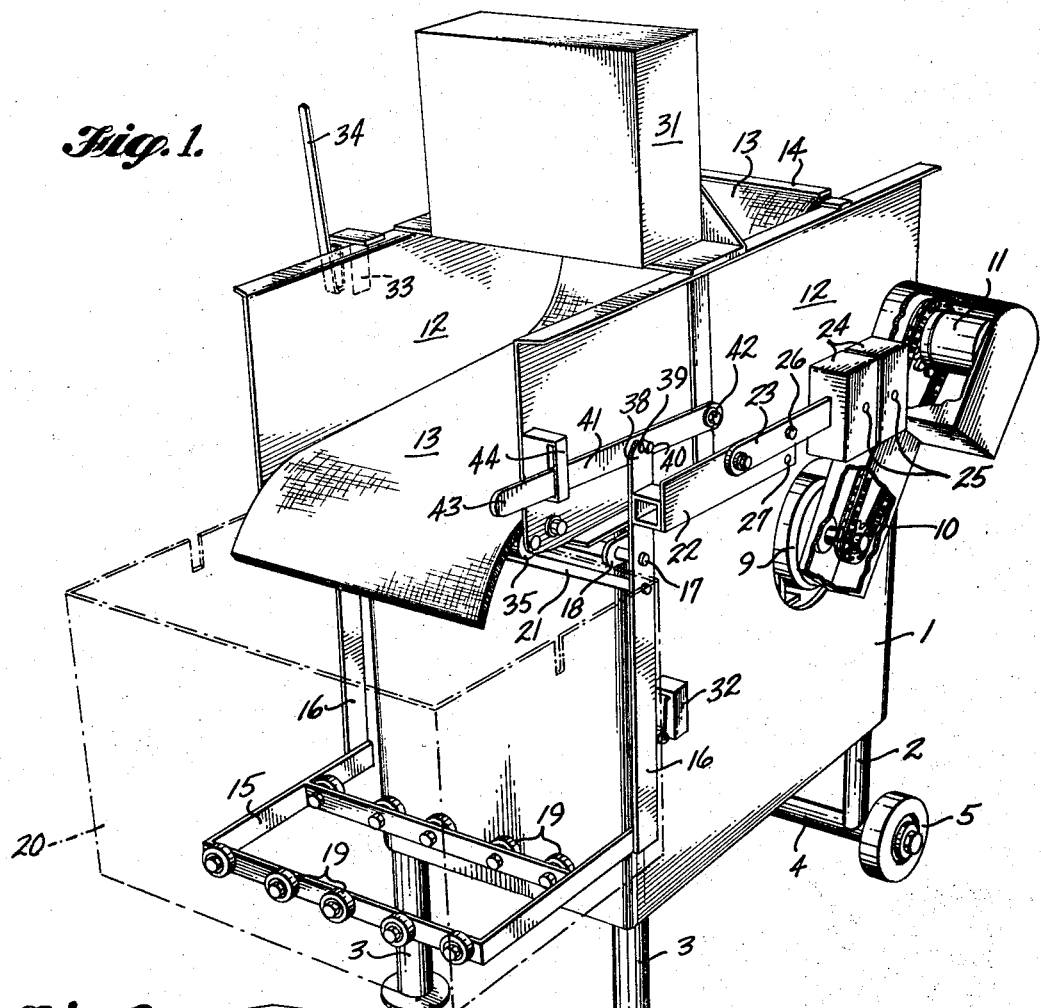
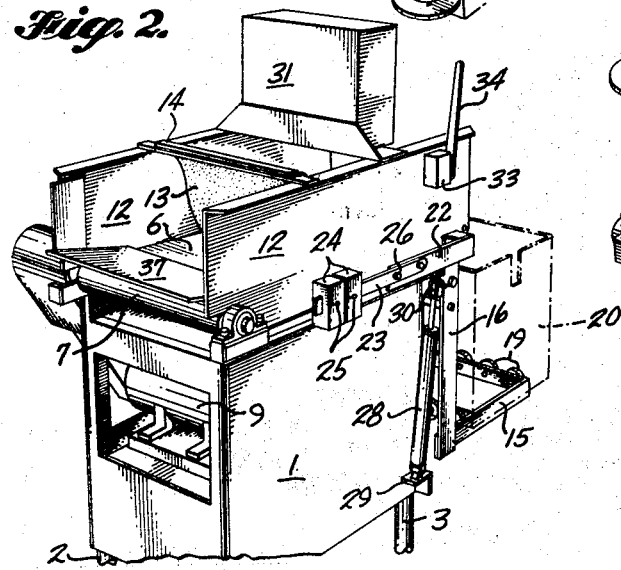
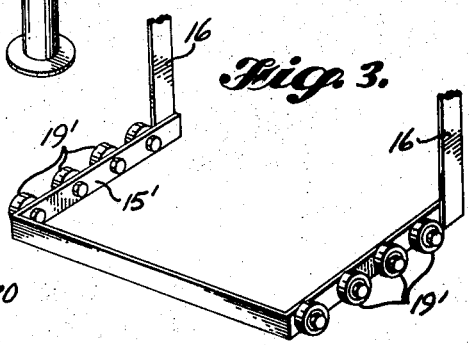
INVENTOR.
JASPER R. CRABB
BY
ATTORNEY

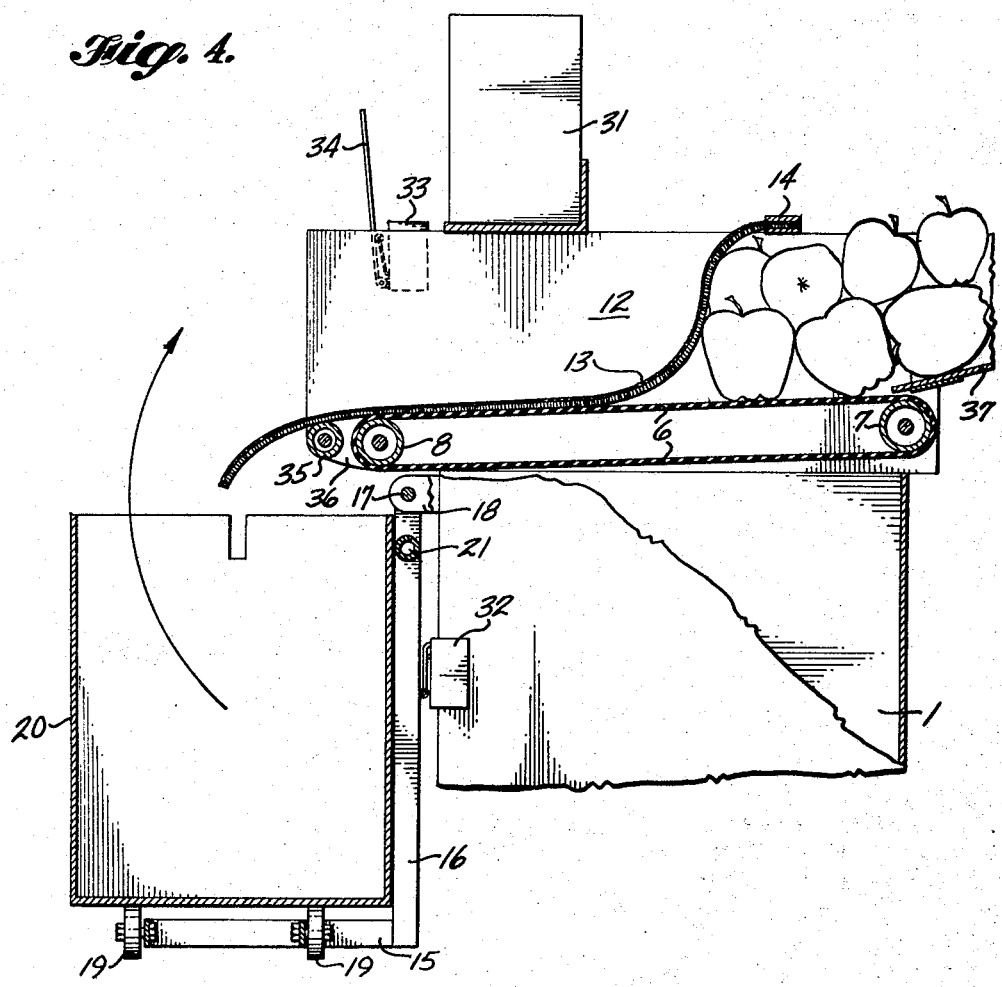
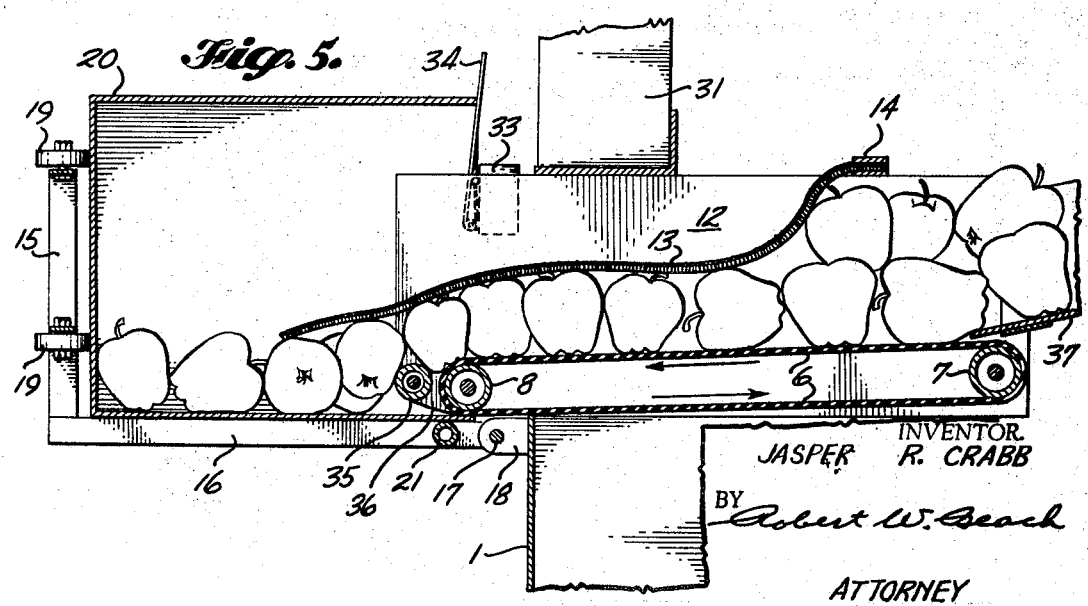

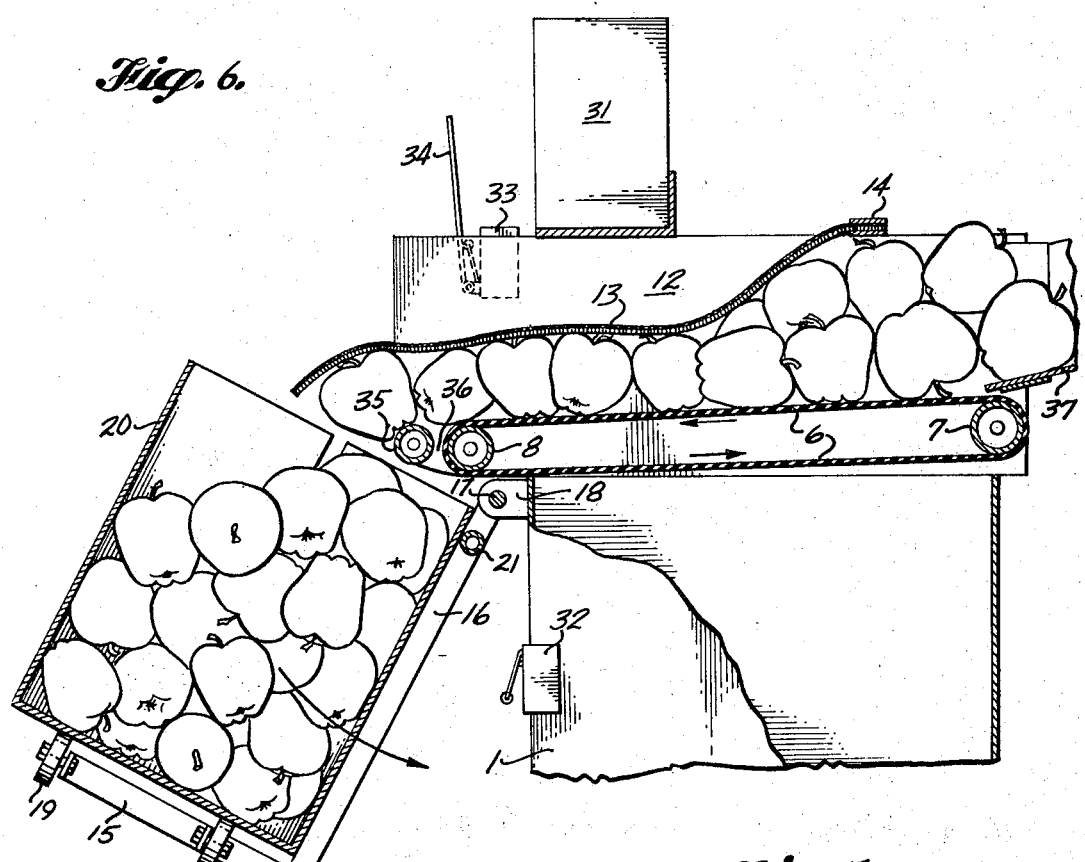
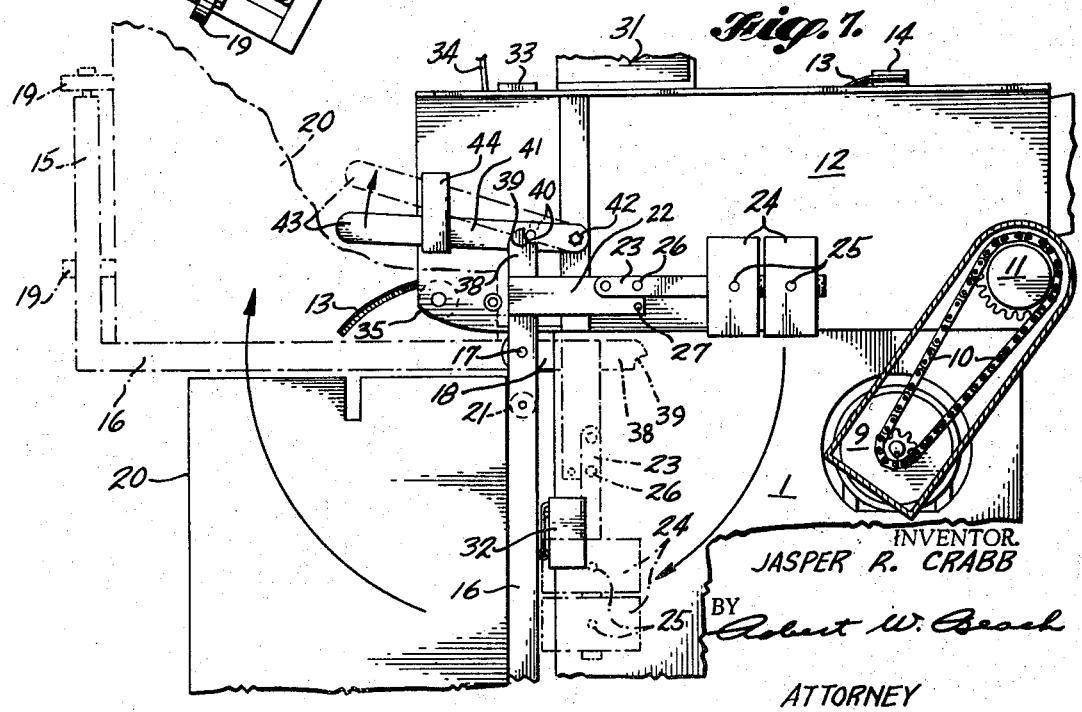

United States Patent Office 3,420,038
Patented Jan. 7, 1969

3,420,038
FRUIT BOX FILLER
Jasper R. Crabb, Yakima, Wash., assignor to AG-Pak Inc., Gasport, N.Y., a corporation of New York
Filed Sept. 7, 1965, Ser. No. 485,316
U.S. Cl. 53—248                2 Claims
Int. Cl. B65b 25/02; 35/52

ABSTRACT OF THE DISCLOSURE

The box filler includes a substantially horizontal fruit-feeding trough along which a conveyor belt moves fruit positively in a horizontal direction. During such movement the fruit is rearranged as necessary by a flexible flap mounted over the conveyor so as to be discharged from the trough as a single uninterrupted layer. A swingable L-shaped box-supporting cradle is provided to support a rectangular box with one side wall substantially horizontal at the bottom and its bottom substantially vertical with the one side wall supported immediately below the feed trough and conveyor belt bottom and with the discharge end of the feed trough extending into the box in such position. A horizontal idler roller beyond the downstream end of the conveyor forms a crotch therewith to hold back the fruit on stopping the conveyor. The machine also includes a jointed or two-piece counterweight arm with means for adjusting the angular relation of the two pieces to insure uniform and complete fill as well as to avoid over fill of boxes of different weights and shape.

---

This application relates to a device for filling boxes with fruit, particularly of types which can be bruised easily, such as apples, pears, peaches and prunes.

Devices for filling fruit boxes with fruit which have been used in the past have deposited the fruit in the boxes by dropping the pieces of fruit to a greater or lesser extent. Such dropping causes bruises which may not be apparent immediately, but which produce discolorations within a few days which impair the appearance of the fruit for display purposes in a store.

It is a principal object of the present invention to provide a device for filling boxes with fruit which will deposit delicate fruit in a box sufficiently gently so that fruit will not be bruised. Specifically it is an object to provide a device by which fruit will be pushed substantially horizontally into the fruit box instead of being dropped into the box or even rolled into it, although some rolling action may occur.

A further object is to provide a device by which a box can be supported with its sides in substantially horizontal position and its bottom in vertical position while fruit is moved into the box in a direction substantially horizontally so as to slide along the lower side of the box or fruit resting on such box side.

Another object is to provide a fruit feed trough which can be inserted into a box supported on its side at a location adjacent to the lower side of the box, from which trough fruit can be pushed substantially horizontally into the box.

An additional object is to provide fruit-depositing mechanism which is capable of being controlled precisely to interrupt the operation of feeding fruit to the box when the desired quantity of fruit by weight has been placed in the box.

A further object is to move fruit into a box as rapidly as possible consistent with avoidance of damage to the fruit by supplying the fruit to the box in a single layer, but with a continual flow.

Another object is to enable the device for supplying fruit to the box to be adjusted to compensate for use of boxes of different types and size, such as wooden boxes or cardboard boxes, for example, and further to enable the device to be adjusted to supply the fruit automatically to different desired weights, depending upon the type of fruit being placed in the box and the size of the box.

It is also an object to provide a box-filling device which will complete a box-filling cycle automatically after it has been initiated so that it is merely necessary to supply to the device the box to be filled with fruit, initiate the filling operation, supply the fruit with which the box is to be filled and remove the filled box.

Further, it is desirable to provide such a box-filling device which is small, compact and mobile, but which can readily be used to receive fruit from different types of storage devices to be placed in boxes.

FIGURE 1 is a top perspective of the box filler as seen from one end and FIGURE 2 is a top perspective of the device viewing the opposite end.

FIGURE 3 is a fragmentary top perspective of an alternate type of box-supporting cradle.

FIGURE 4 is a side elevation of the box filler, with parts broken away; FIGURE 5 is a similar view of the filler with additional parts broken away and showing the box and its support in a different position; and FIGURE 6 is a view similar to FIGURE 4 showing the box and its support in still a different position.

FIGURE 7 is an additional side elevation of the device with fewer parts broken away than in FIGURE 4.

The fruit box filler is mounted on a stand or frame 1 supported by legs 2 and 3. The legs 2 are connected by an axle 4, on opposite ends of which are mounted wheels 5. The stand can, therefore, be transported readily from place to place by being tilted sufficiently to raise legs 3 so that the stand is supported by wheels 5. It can then be trundled like a wheelbarrow, but when the filler is located for operation legs 3 will be lowered to contact the ground or floor so that the filler will remain stationary.

A very important feature of the filling device of the present invention is that the fruit is moved positively and substantially horizontally into the box to be filled in a single uninterrupted layer. The fruit, whether apples, pears, peaches, prunes or the like can be transported in this manner by a substantially horizontal endless belt 6 encircling and stretched between a drive roller 7 at one end and an idler roller 8 at the opposite end. Such conveyor belt can be made of soft rubber so as to contact the fruit gently and it can be formed as a seamless belt or the ends of the sheet forming the belt can be vulcanized together to form a joint of a character substantially the same as the body of the belt.

The belt-mounting rollers 7 and 8 are journaled in parallel relationship on the stand 1 and the roller 7 is driven by motor 9 through a drive chain 10. Such motor is shown in FIGURES 1 and 2 as being housed in the stand below the belt conveyor 6. Such belt conveyor may be driven intermittently by an electric clutch 11 which can be energized electrically to connect the upper sprocket carrying chain 10 with the belt-mounting roller 7.

In order to channel movement of the fruit carried by the conveyor belt 6, such conveyor is mounted in and forms the bottom of a feed trough superimposed on the stand 1 which is formed by sides 12. Between these sides and overlying the conveyor 6 is a flap 13 supported on the upper edges of the trough sides 12 by a crossbar 14 which secures one end of the flap. Such flap is quite flexible but should be made of soft durable material and extends from the anchor bar 14 beyond the discharge end of the feed trough 12. Such flap can be satisfactorily made of carpet material mounted with its pile side down. The pressure of this flap on fruit in a second or upper layer and the friction of the flap with such fruit cooperate with the belt 6 engaging the fruit in the lower layer which moves the fruit along the feed trough so that the upper fruit pieces will roll and wedge down between fruit pieces contacting the belt until only a single layer of fruit pieces is interposed between the flap and belt. The frictional drag produced on such single layer of fruit will oppose the movement of the fruit effected by the upper stretch of the belt 6 so that the single layer of fruit will be uninterrupted as long as there is a supply of fruit delivered to the supply end of the feed trough. Rubbing of the fruit against the pile surface of the flap produces a polishing action on the fruit.

A box-supporting cradle including a box bottom-supporting frame 15 and hanger bars 16 for such frame is mounted by a pivot rod or rods 17 on brackets 18 beneath the discharge end of the conveyor 6 and feed trough 12. The frame 15 carries two rows of skate wheels 19 on which a fruit box 20 may rest. The skate wheels 19 are shown in FIGURES 1 and 6, for example, as being rotatable about axes extending parallel to the direction of movement of the conveyor 6 and the length of the feed trough 12 when the cradle is in its lower position shown in FIGURES 1 and 4. The box 20 can, therefore, be moved into the cradle onto such wheels by movement in a direction transversely of the direction of movement of the fruit into the box. Alternatively, skate wheels 19' can be mounted on the alternate box-supporting frame 15' to rotate about axes extending horizontally transversely of the direction of travel of conveyor 6 and of the length of the feed trough 12. A box can be placed on and removed from the wheels of such frame by movement parallel to the direction of feed of the fruit, but opposite to such direction in placing the box on the cradle.

In order to improve the rigidity of the box-supporting cradle for swinging about the pivot means 17, a tube 21 can interconnect the upper ends of the hanger bars 16 to maintain them in properly spaced relationship. At the side of pivots 17 opposite the box bottom-supporting frame, arms 22 are secured to the hanger bars 16 and project from such bars so that the lengths of the arms 22 are disposed substantially perpendicular to the bars 16 in a direction opposite to the direction in which the frame 15 projects from such bars. Auxiliary arms 23 may be mounted pivotally on arms 22 and carry one or more counterweights 24. These counterweights can be secured by setscrews 25 in proper positions along the auxiliary arms 23 so as to balance the weight of the box 20 and its contents in various swung positions of the box-supporting cradle about pivots 17.

When the fruit box is empty and supported by the cradle with its sides disposed substantially horizontal as in FIGURE 5, the arms 22 and auxiliary arms 23 will be hanging substantially vertical. As fruit is pushed into the box the cradle will be swung downward about pivots 17, as shown in FIGURE 6, and the arms 22, auxiliary arms 23 and counter-balancing weights 24 will swing upwardly. As such arms and weights swing upward, the counterbalancing force produced will increase while the effect on swinging of the cradle produced by placing more fruit in the box is reduced. In other words, the leverage of the counterweights to produce a balancing torque about pivots 17 is greatest when the arms are raised and the box is lowered.

In addition to adjusting the position of the counterweights 24 along auxiliary arms 23, the torque on the hanger bars 16 can also be altered somewhat when the box is in the raised position of FIGURE 5 by varying the angular relationship between the main arms 22 and the auxiliary arms 23, such as by connecting such arms with a pin or bolt 26 either in the position shown in FIGURE 1 or extending through the other hole 27 in arm 22. Irrespective of the adjusted position of the counterweights 24 or of the arms 22 and 23 or of the swung positions of the hanger bars 16, a snubber 28 can be connected between a bracket 29 and a lug 30 carried by a hanger bar 16 to eliminate abrupt movements of the cradle about pivots 17. Such snubber is shown in FIGURE 2 as being in the form of a dashpot piston and cylinder.

Because it is necessary to stop the flow of fruit through the feed trough 12 each time a box is filled with fruit, control means must be provided for interrupting the drive of the conveyor 6 when each box has been filled. Preferably such deenergization of the conveyor is effected automatically by some incident of the box-filling operation. While the motor 9 could be deenergized to terminate driving of the conveyor 6, it is preferred that control over the conveyor drive be effected by energizing and deenergizing the magnetic clutch 11. Controls for the motor and magnetic clutch conveniently can be housed in a box 31 mounted on the upper edges of the feed trough walls 12. Disengagement of the clutch 11 can be effected by actuation of switch 32 which is mounted on the stand 1 in a position to be actuated by the hanger bars 16. As these bars move from the position of FIGURE 6 to that of FIGURES 1 and 4, one of such bars will engage the arm of switch 32 to actuate it. Such actuation either may open the magnetic clutch electric circuit or may close a control circuit to the control mechanism in box 31, which in turn will effect deenergization of magnetic clutch 11.

Alternatively, when an empty box is moved into the position shown in FIGURE 5 with its opposite walls disposed substantially horizontally ready to be filled, the magnetic clutch 11 must be energized to start the conveyor 6 again. Such energization of the magnetic clutch can be effected by actuation of switch 33 resulting from swinging of lever 34 to the right, as seen in FIGURES 1, 4 and 6, into the position of FIGURE 5. Such swinging is effected by the rim of the box engaging the lever as the box is swung from the lower position shown in FIGURE 4 into the upper position of FIGURE 5. Both of the switches 32 and 33 may be of the momentary contact type or at least should be connected in a holding circuit in the controls of box 31 so that, as the cradle swings downward from the position of FIGURE 5 so that the box edge is retracted from the lever 34, the resultant manipulation of 33 will not deenergize clutch 11.

During the operation of filling a box with fruit, it will swing progressively downward about the axis of pivots 17, as indicated by the arrow in FIGURE 6. When the box reaches its lowermost position of FIGURE 4 so that the hanger bar 16 effects actuation of switch 32 to stop the conveyor belt 6, it is desirable for the supply of fruit to the box to be cut off almost instantaneously. At the moment of deenergization of clutch 11, it is possible that some fruit might be supported only partially by the conveyor. In order to provide a sharp cutoff of fruit flow, an idler roll 35 supported by antifriction bearings is mounted slightly beyond the discharge end of the belt conveyor 6 so as to provide a sufficient slot or space 36 between the roller and the conveyor to form a fruit-holding crotch. If fruit has passed beyond the crest of this roller, it will be deposited in the box. On the contrary, if the conveyor 6 stops before particular fruit has reached the crest of the roller 35 it will remain cradled in the crotch between the conveyor end and the roller so as to be ready for delivery to the next box when the conveyor is started again.

In order to increase the storage space for fruit supplied to the box filler without appreciably increasing the size of the device, an apron 37 can be mounted between the walls 12 of the feed trough overlying the conveyor roller 7, as shown in FIGURES 2, 4, 5 and 6. Such apron may, if desired, extend to any convenient source of fruit supply, such as a hopper or a supply conveyor. Alternatively, fruit may be supplied to the supply end of the feed trough intermittently by hand.

The weight of a box filled with fruit must be sufficient to swing the box-supporting cradle into its lowermost position shown in FIGURE 4 in opposition to the leverage of the counterweights 24. It would be undesirable, however, for the counterweights to swing the box-supporting cradle upward again to the position of FIGURE 5 as soon as the box filled with fruit has been removed from the cradle because, in that case, no opportunity would be afforded for placing an empty box on the cradle, as indicated in FIGURE 4. Consequently, latch means are provided to maintain the box-supporting cradle in its lowermost position even after the filled box has been removed from it until it is desired to initiate the next box-filling operation. In the upper end 38 of a hanger bar 16 a notch 39 is provided, as shown in FIGURE 7, in which a pin 40 can engage. This pin is carried by and projects from a lever 41 swingable about a pivot 42 by manipulation of the handle 43 on the opposite end of the lever. Such lever is movable between the lower full-line position shown in FIGURE 7, in which the pin 40 is engaged in the notch 39, and the upper position shown in broken lines in FIGURE 7, in which the pin has been withdrawn from the notch 39 to a position above the upper end of the extension 38, so that the hanger bar 16 can swing about its pivots 17 in the direction indicated by the arrow in that figure impelled by the force of the counterweights 24 moving in the direction indicated by another arrow in FIGURE 7.

If the box-supporting cradle is latched in the lower position shown in FIGURES 1, 4 and 7 and an empty box is placed on the cradle, a box-filling operation can be initiated by lifting the handle 43 of lever 41 to move the lever into the broken-line position shown in FIGURE 7. The projection 38 of hanger bar 16 is thus released from pin 40 so that the weight of the counterweights 24 swings the cradle and box in the direction indicated by the arrow in FIGURE 4 until the box reaches the position of FIGURE 5. Movement into such position causes the upper side of the box 20 to push switch lever 34 to the right for energizing clutch 11 to start the conveyor belt 6. Movement of the conveyor belt as indicated by the arrows in FIGURE 5 causes a single uninterrupted layer of fruit to be pushed into the box, as indicated in FIGURE 5. When this first layer has entered the box, the weight of such layer will cause the cradle to swing downward somewhat and the fruit being pushed by the conveyor belt will move over the layer of fruit thus deposited in the box to be pushed toward the box bottom on top of the first layer. Such second layer of fruit will cause the box-supporting cradle to swing downward through a substantial angle so that additional fruit can be pushed more readily into the box and it will be moved along a substantially horizontal surface of fruit in the box as layer upon layer of fruit is pushed into it. Even when the box is nearly full of fruit, as indicated in FIGURE 6, fruit from the feed trough will still be pushed along a substantially horizontal path over the fruit in the box to the opposite side of the box until it has been filled completely. At that time the box-supporting cradle will have reached its lowermost position so that the hanger bar 16 will have engaged switch 32 to deenergize the clutch 11, as previously described, until the next box-filling operation is initiated.

I claim as my invention:

1. A machine for filling fruit into boxes each having a rectangular bottom wall and rectangular side walls rising from the edges of said bottom wall and forming a rectangular mouth, the machine including a supporting frame, an L-shaped cradle having substantially perpendicular sides one of which is adapted to support said bottom wall and the other of which is adapted to support one of said side walls, and means pivotally supporting said cradle on said frame to swing about a horizontal axis arranged lengthwise and adjacent that edge of said one of said side walls which forms the mouth of the box; wherein the invention comprises an endless conveyor belt mounted on said frame to have an upper stretch moving in a close to horizontal path terminating at its downstream end above and adjacent said axis, an idler roll mounted on a fixed axis spaced from and parallel with said downstream end of said upper stretch of said belt to form with said belt a crotch holding back fruit on stopping said belt, means supplying to and distributing fruit on said upper stretch in the form of a single uninterrupted layer and pressing said layer downwardly on said upper stretch with sufficient force to enable said upper stretch to positively propel said layer away from the downstream end thereof, means swinging said cradle about its axis to an initial fill position where said one of said side walls is generally horizontal and positioned to have positively propelled therealong said layer of fruit from said upper stretch of said belt, without substantial drop of fruit, to form a first layer of fruit in said box, said means swinging said cradle being responsive to the weight of the fruit in said box for swinging said cradle about its axis whereby said single uninterrupted layer of fruit on said belt is thereafter positively propelled, without substantial drop of fruit, along the top of said first layer to form a second layer, and following which the uninterrupted layer of fruit on said belt is positively propelled along a substantially horizontal path over the fruit in the box until the same is filled.

2. A machine for filling fruit into boxes each having a rectangular bottom wall and rectangular side walls rising from the edges of said bottom wall and forming a rectangular mouth, the machine including a supporting frame, an L-shaped cradle having substantially perpendicular sides one of which is adapted to support said bottom wall and the other of which is adapted to support one of said side walls, and means pivotally supporting said cradle on said frame to swing about a horizontal axis arranged lengthwise and adjacent that edge of said one of said side walls which forms the mouth of the box; wherein the invention comprises an endless conveyor belt mounted on said frame to have an upper stretch moving in a close to horizontal path terminating at its downstream end above and adjacent said axis, means supplying to and distributing fruit on said upper stretch in the form of a single uninterrupted layer and pressing said layer downwardly on said upper stretch with sufficient force to enable said upper stretch to positively propel said layer away from the downstream end thereof, means swinging said cradle about its axis to an initial fill position where said one of said side walls is generally horizontal and positioned to have positively propelled therealong said layer of fruit from said upper stretch of said belt, without substantial drop of fruit, to form a first layer of fruit in said box, said means swinging said cradle being responsive to the weight of the fruit in said box for swinging said cradle about its axis whereby said single uninterrupted layer of fruit on said belt is thereafter positively propelled, without substantial drop of fruit, along the top of said first layer to form a second layer, and following which the uninterrupted layer of fruit on said belt is positively propelled along a substantially horizontal path over the fruit in the box until the same is filled, and said means swinging said cradle including a main counterweight arm operatively connected to said cradle, an auxiliary counterweight arm, a horizontal pivot connecting said auxiliary counter weight arm to said main counterweight arm to form an extension thereof, a counterweight on the outboard end of said auxiliary arm and means for adjusting the angular relation of said counterweight arms about said pivot with reference to each other to suit boxes of different weight and shape and to insure the uniform and complete fill thereof without overfill.

References Cited

UNITED STATES PATENTS

| | | |
|---|---|---|
| 1,745,381 | 2/1930 | Ray. |
| 1,886,295 | 11/1932 | Morris _____ 53—248 |
| 2,747,353 | 5/1956 | Shibata _____ 53—249 |
| 3,040,826 | 6/1962 | Sheetz _____ 53—245 |
| 3,229,444 | 1/1966 | Rouse _____ 53—248 |
| 3,237,365 | 3/1966 | Koulakoff _____ 53—55 |

TRAVIS S. McGEHEE, *Primary Examiner.*

R. L. SPRUILL, *Assistant Examiner.*

U.S. Cl. X.R.

53—245